(12) United States Patent
Auernhammer et al.

(10) Patent No.: US 8,250,304 B2
(45) Date of Patent: Aug. 21, 2012

(54) CACHE MEMORY DEVICE AND SYSTEM WITH SET AND GROUP LIMITED PRIORITY AND CASTING MANAGEMENT OF I/O TYPE DATA INJECTION

(75) Inventors: Florian Alexander Auernhammer, Adliswil (CH); Patricia Maria Sagmeister, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 12/327,290

(22) Filed: Dec. 3, 2008

(65) Prior Publication Data
US 2009/0144505 A1    Jun. 4, 2009

(30) Foreign Application Priority Data
Dec. 3, 2007   (EP) .................................. 07122112

(51) Int. Cl.
*G06F 12/00*   (2006.01)
*G06F 13/00*   (2006.01)
*G06F 13/28*   (2006.01)

(52) U.S. Cl. ........ 711/128; 711/133; 711/118; 711/141; 711/142; 711/145

(58) Field of Classification Search ................... 711/128
See application file for complete search history.

(56) References Cited

U.S. PATENT DOCUMENTS

| 5,293,608 | A | | 3/1994 | Johnson et al. | |
|---|---|---|---|---|---|
| 5,742,792 | A | * | 4/1998 | Yanai et al. | 711/162 |
| 5,983,329 | A | * | 11/1999 | Thaler et al. | 711/163 |
| 6,434,669 | B1 | * | 8/2002 | Arimilli et al. | 711/128 |
| 6,711,650 | B1 | * | 3/2004 | Bohrer et al. | 711/118 |
| 7,246,205 | B2 | | 7/2007 | Balakrishnan et al. | |
| 2003/0196045 | A1 | * | 10/2003 | Matsubara et al. | 711/137 |
| 2005/0114605 | A1 | * | 5/2005 | Iyer | 711/133 |
| 2005/0246500 | A1 | * | 11/2005 | Iyer et al. | 711/137 |
| 2006/0064518 | A1 | | 3/2006 | Bohrer et al. | |
| 2008/0040554 | A1 | * | 2/2008 | Zhao et al. | 711/133 |
| 2008/0059707 | A1 | * | 3/2008 | Makineni et al. | 711/122 |

* cited by examiner

*Primary Examiner* — Yaima Campos
(74) *Attorney, Agent, or Firm* — Suiter Swantz pc llo

(57) ABSTRACT

A memory device comprising a cache memory with a predetermined amount of cache sets, each cache set comprising a predetermined amount of cache lines. Each cache line is operable to indicate a cache data injection into the particular cache line triggered by a bus-actor.

24 Claims, 7 Drawing Sheets

CACHE MEMORY DEVICE AND SYSTEM WITH SET AND GROUP LIMITED PRIORITY AND CASTING MANAGEMENT OF I/O TYPE DATA INJECTION

CROSS-REFERENCE TO RELATED APPLICATIONS

The present application claims the benefit under 35 U.S.C. §119 of EPO; Application Serial Number 07122112.1, filed Dec. 3, 2007 entitled "MEMORY DEVICE," which is incorporated herein by reference.

TECHNICAL FIELD

The present invention relates to a memory device, in particular to a memory device comprising a cache memory with a predetermined amount of cache sets, each cache set comprising a predetermined amount of cache lines.

BACKGROUND

A cache memory may be a set-associative cache memory. The set-associative cache memory is divided into a predetermined amount of cache sets. Each cache set comprises a predetermined number of cache lines, the predetermined number of cache lines referred to as the associativity of the cache memory. The particular cache set, where data is written to, is determined by an address of the data, whereas the associativity of the cache represents the number of cache lines within the determined cache set available for the particular data address.

Input-Output data transfers, also referred to as IO-data transfers, are commonly processed by direct memory access transfers, also referred to as DMA transfers, going from the IO-device to, for example, the main memory.

With cache injection bus-actors like IO-devices and potentially also processing units or data copy engines can explicitly specify a cache location to which they want to push data. Cache injection is a data source driven technique that reduces memory latency and data transfer delays by pushing cache injection data directly into cache memory, ideally into cache memory tightly coupled to a processor unit processing the data.

U.S. Pat. No. 6,711,650 B1 discloses a mechanism in a cache memory determining if a bus operation is a data transfer from a first memory to a second memory. If the bus operation is such a data transfer, a determination is made in the cache memory as to whether or not the cache memory includes a copy of data from the data transfer. If a copy of data from the data transfer is not included in the cache memory, a cache line is allocated in the cache memory to store a copy of data from the data transfer. If the cache memory does include a copy of data from the data transfer, the cache memory updates the copy of data within the cache memory with the new data during the data transfer.

US2006/0064518 A1 discloses a method and apparatus for managing cache injection in a multi-processor system. The method and apparatus either detect the target processor of a DMA completion routine that typically processes the DMA data or direct processing of the DMA completion routine to a particular processor, thereby enabling cache injection to a cache that is coupled with the particular processor that processes the DMA data. The target processor may be identified by determining the processor handling the interrupt that occurs on completion of the DMA transfer.

U.S. Pat. No. 5,293,608 discloses a system and method for optimizing the utilization of a cache memory in an input/output controller in a computer system. The optimization system calculates a demotion time where the demotion time is an approximation of the length of the time that a track of data will reside in cache memory after its last input/output request from a central processing unit. An elapsed time between successive input/output requests from the central processing unit for the requested track of data is determined and compared to the demotion time. If the elapsed time is greater than the demotion time, the corresponding track of data associated to the elapsed time is referred to as not efficient cache user and is inhibited from being loaded into the cache memory, thereby displacing potentially more efficient uses of cache memory.

U.S. Pat. No. 7,246,205 B2 discloses monitoring of performance parameters to enable or disable push cache operations depending on whether the performance parameters are within a predetermined range. The patent discloses another method which monitors an amount of credits associated with a device and enables or disables push cache operations dependent upon whether the device has sufficient remaining credits.

Consequently, it is a challenge to provide a memory device comprising a mechanism which enables efficient cache use.

SUMMARY OF THE INVENTION

According to one aspect of an embodiment of the invention, a memory device comprising a cache memory with a predetermined amount of cache sets is disclosed, each cache set comprising a predetermined amount of cache lines. Each cache line is operable to indicate data injection into the particular cache line triggered by bus-actors.

A processor system may typically comprise at least one processor unit with a central processing unit and at least one internal memory device comprising the cache memory, the internal memory device being tightly coupled to the central processing unit. Furthermore, the processor system may comprise an external memory device comprising the cache memory, the external memory device being not integrated into the processing unit. In addition, the processor system may comprise a main memory. To exchange data with other processor systems, the processor system typically comprises also IO-devices such as network cards or other types of communication components. The components of the processor system are typically interconnected via a local bus system operable to transfer data from one component of the processor system to the other and vice versa. Bus-actors may typically be processor system components like IO-devices or processing units or data copy engines like DMA controllers, being operable to trigger data injection into internal and/or external cache memories of the processor system. Bus-actors can be seen as data-sources providing data to the processing units of the processor system. So data injection can be denoted as a data-source driven transfer- and storage-process of data into the particular memory device with cache memory. By indicating data injection triggered by corresponding bus-actors, more flexible and advantageous cast-in and cast-out processing of cache line data may be computed.

According to an embodiment, at least one injection-bit is associated to the particular cache line to indicate cache injection. The memory device is operable to set the at least one injection-bit, which is associated to the particular cache line, if data is pushed from a bus-actor into the particular cache line.

By setting the at least one injection-bit for indicating a cache injection data entry in the particular cache line, efficient computations of cast-in and cast-out processing of the particular cache line can be realized.

According to a further embodiment, the memory device being operable to unset the at least one injection-bit if the particular pushed cache injection data entry is accessed by a component to process the cache injection data.

By unsetting the at least one injection-bit of the particular cache line the handling of cache lines for storing non-injection data and/or cache injection data can be improved. With a set injection-bit, the particular cache line, indicates cache injection data pushed into the particular cache line. With an unset injection-bit, the particular cache line can be handled as a conventional cache line for storing non-injection data or for storing new cache injection data.

According to a further embodiment, more than one control bit is associated to the particular cache line to indicate a current state of its data, whereas a cache line injection state is associated to a predetermined combination of the control bits in such a way that the predetermined combination of control bits is different to the control bit combinations representing states of the data of the particular cache line.

In processor systems with different originators and recipients of data, a set of control bits is available for each cache line indicating the current state of the data stored in the particular cache line. The control bits are often referenced as coherency bits indicating for instance the owner and/or the modified state of the cache line data. Cache injection data is typically exclusively owned by the particular cache memory; that means that the cache injection data is not stored elsewhere in the processor system. Cache injection data typically implies a modified state that means that before displacing a particular cache injection data entry in cache memory, it has to be written back to memory, for example, to main memory. With control bits, different states of cache line data can be indicated by using different combinations of control bits. Typically, not all control bit combinations are used, thus providing undefined and unused combinations which can be used to indicate a cache line injection state if cache injection data is stored in the particular cache line. So cache injection is typically represented by only one valid state, thus providing an easy way of marking cache injection data in the particular cache line without using additional storage space. Using the injection-bit to indicate cache injection data, the control bits can be used for supplemental information storage, different to the owner and/or the modified state of the cache line data.

According to a further embodiment, more than one control bit and at least one injection-bit are associated with a particular cache line, with the memory device being operable to store supplemental information different than the current state of the data of the particular cache line in the more than one control bit while the at least one injection-bit of the particular cache line is set and otherwise to store the current state of the cache line data in the more than one control bit.

While the particular injection-bit of a cache line is set, the cache line comprises cache injection data. This typically implies a modified state that means that before displacing a particular cache injection data entry in cache memory, it has to be written back to memory. While indicating cache injection data via set injection-bit, the control bits can be used for supplemental information storage, as for example, origin informations or priority informations.

According to a further embodiment, the more than one control bit represents group information, the memory device being operable to associate a particular group to each cache line comprising cache injection data and to associate cache lines comprising cache injection data entries with common predetermined properties to identical groups.

A group information represents specific cache injection data properties, as for example a particular origin of cache injection data. Cache lines comprising cache injection data with common cache injection data properties are associated to identical groups. Therefore one group can be associated to multiple cache lines within the particular cache set. While the particular injection-bit of a cache line is set, the control bits can be used for storing group information associated to the particular cache line. By using the more than one control bit for group information storage, more details can be associated to each cache injection data entry, allowing a more efficient processing of cache injection data.

According to a further embodiment, multiple group-present-bits are associated to the particular cache set, whereas one group-present-bit is associated to each group, the memory device being operable to set the particular group-present-bit if at least one cache line in the particular cache set comprises cache injection data associated to the particular group.

The efficiency for processing the cache memory can be improved by checking only the particular group-present-bit to get information if at least one cache line in the particular cache set comprises cache injection data associated to the particular group.

According to a further embodiment, multiple group-limit-bits are associated to the particular cache set, whereas one group-limit-bit is associated to each group, the memory device being operable to set the particular group-limit-bit if a predetermined amount of cache lines comprising cache injection data associated to the particular group is reached.

If an amount of cache lines associated to each group can be predetermined and the particular group-limit-bit associated to the particular group is set, if the predetermined amount of cache lines is reached associated to the particular group, the efficiency for processing the cache memory can be improved.

According to a further embodiment, at least one set-injection-bit is associated to the particular cache set. The memory device is operable to set the set-injection-bit if a predetermined amount of injection-bits in the particular cache set is set and to unset the set-injection-bit if the amount of set injection-bits is lower than the predetermined amount of set injection-bits.

A cache line filled with cache injection data is marked by the injection-bit and/or by the cache line injection state via control bits. If the particular cache set is filled with the predetermined amount of cache injection data, the set-injection-bit is set, typically improving the efficiency for processing the cache memory by checking only the set-injection-bit to get information if the particular cache set is already filled with the predetermined amount of cache injection data or if free cache lines are available for storing cache injection data.

According to a further embodiment, a particular cache set counter unit with a cache set counter is associated to the particular cache set. The memory device is operable to increment the cache set counter on each setting of one injection-bit of the particular cache set or to decrement the cache set counter on each resetting of one injection-bit of the particular cache set.

A cache set counter is associated to each cache set to capture the amounts of cache injection data entries stored in the particular cache set. Beside the set-injection-bit, the counter reading of the cache set counter provides information on the current amount of cache injection entries stored within the particular cache set.

According to a further embodiment, the memory device is operable to inhibit a further cache data injection into the particular cache set if a predetermined cache set counter limit is reached by the cache set counter.

By limiting the amount of cache injection data for each corresponding cache set, the casting out of valuable non-injection data can be reduced, thus allowing an improvement of processor performance. A thrashing of valuable data by casting out this data into memory devices with slower data access rates can be reduced to a minimum.

According to a further embodiment, the memory device is operable to push cache injection data into cache lines with set injection-bit if a predetermined cache set counter limit is reached by the cache set counter.

By limiting the amount of cache injection data and updating cache lines already comprising cache injection data, the casting out of valuable non-injection data can be reduced, thus improving processor performance. This contributes to avoiding cache thrashing through data injection.

According to a further embodiment, the memory device is operable to predetermine the cache set counter limit dependent on the data processing and/or workload conditions of a processing unit, which is associated to the cache memory.

By predetermining the cache set counter limit dynamically dependent on the data processing and/or workload conditions of the associated processing unit, its processing performance can be improved. If the processing unit, for instance, is running processes that profit from cache injection data, more cache injection data can be pushed into cache memory by setting the cache set counter limit on a higher limit. For running processes that do not profit from cache injection data, the cache set counter limit can be set on a lower limit.

According to a further embodiment, the memory device comprises a cache counter unit with a cache counter. The memory device is operable to increment the cache counter on each setting of one injection-bit in the cache memory or to decrement the cache counter on each resetting of one injection-bit in the cache memory.

A cache counter unit can be associated to at least one of the available cache memory devices in the processor system and is operable to capture cache injection data pushed into cache memory. The counter reading of the cache counter provides information about the current amount of cache injection data entries in the particular cache memory, thus allowing a more flexible and advantageous cast-in and cast-out processing of cache line data.

According to a further embodiment, the memory device is operable to inhibit a further push of cache injection data into the cache memory if a predetermined cache counter limit is reached by the cache counter.

By limiting the amount of cache injection data for the particular cache memory, casting out of valuable non-injection data can be reduced, thus allowing an improvement of processing performance of the particular processing unit. This contributes to avoiding cache thrashing through data injection.

According to a further embodiment, the memory device is operable to push cache injection data into cache lines with set injection-bit, if a predetermined cache counter limit is reached by the cache counter.

By limiting the amount of cache injection data and updating cache lines already comprising cache injection data entries, casting out of valuable non-injection data can be reduced, thus improving processor performance.

According to a further embodiment, the memory device is operable to predetermine the cache counter limit dependent on the data processing and/or workload conditions of the processing unit, which is associated to the cache memory.

By predetermining the cache counter limit dynamically dependent on the data processing and/or workload conditions, the processing performance of the processing unit can be improved. If the processing unit, for instance, is running processes that profit from cache injection data in the cache memory, the cache counter limit can be set on a higher limit. For running processes that do not profit from cache injection data, the cache counter limit can be set on a lower limit.

According to a further embodiment, the memory device comprises at least one cache counter unit with the cache counter and at least one cache set counter unit with one cache set counter, whereas the particular cache set is associated to at least one of the at least one cache set counter unit.

A memory device comprising both the cache counter unit and a particular cache set counter unit associated to the particular cache set, allows a more efficient processing of cache injection data to be pushed into cache memory.

According to a further embodiment, the cache counter limit of the cache counter is equal or bigger than the product of the cache set counter limit of the particular cache set counter and the amount of cache sets associated to the cache memory.

By setting the cache counter limit equal to or bigger than the product of the cache set counter limit and the amount of cache sets associated with the cache memory, the cache set counter limit is more relevant to limit the amount of cache injection data entries in the particular cache set than the cache counter limit. If the cache set counter limit is set to a value smaller than the associativity of the cache memory, the cache set cannot be filled with cache injection data only. This allows a more distributed storage of cache injection data among the available cache sets of the particular cache memory.

According to a further embodiment, the cache counter limit of the cache counter is smaller than the product of the cache set counter limit of the particular cache set counter and the amount of cache sets associated to the cache memory.

By setting the cache counter limit smaller than the product of cache set counter limit and the amount of cache sets associated to the cache memory, both limits are relevant to limit the amount of cache injection data entries in the particular cache set. The casting out of valuable non-injection data can be reduced, thus improving processor performance.

According to a further embodiment, the memory device is operable to cast-out cache data of cache lines of the particular cache set dependent on the predetermined cast-out policy of cache data and to push cache injection data into the particular cache line and to set the injection-bit of the particular cache line if the cache set counter limit is not reached by the cache set counter.

The predetermined cast-out policy is typically a least recently used policy, replacing the least recently used data entries in the particular cache set with new data entries. Especially if the least recently used cache data entry is replaced by cache injection data, a flexible way for cache injection data storage and non-injection data storage in the cache memory device is possible.

According to a further embodiment, the memory device is operable to cast-out cache lines of the particular cache set comprising cache injection data dependent on the predetermined cast-out policy.

By replacing also cache lines comprising cache injection data, a flexible way for cache injection data storage and non-injection data storage in the cache memory device is possible.

According to a further embodiment, the memory device is operable to cast-out only cache lines of the particular cache set with unset injection-bit dependent on the predetermined cast-out policy.

By replacing only cache lines with unset injection-bit, a flexible way for cache injection data storage and non-injection data storage in the cache memory device is possible.

Basically, the cast-out policy can be applied in different ways. If the least recently used cast-out policy is used, least recently used cache lines with non-injection data entries can be replaced with cache injection data or non-injection data. The least recently used cast-out policy can also be applied on cache lines comprising cache injection data or non-injection data, replacing the least recently used data entry in the particular cache set with cache injection data or non-injection data. It is further possible to replace only least recently used cache injection data entries with new cache injection data entries, without casting-out cache lines comprising non-injection data. Also other cast-out policies are applicable. Especially if the cast-out policy can be configured dynamically dependent on the current data processing, a flexible way for cache injection data storage and non-injection data storage in the cache memory device is possible.

According to a further embodiment, the memory device is operable to redirect further cache injection data to slower memory devices if the cache set counter limit of the cache set counter is reached.

Memory devices which have slower data access rates than processing unit coupled cache memories are typically main memories or lower leveled cache memories. Processor systems are typically characterized by a memory hierarchy offering different types of memory, where each level of hierarchy has the properties of higher data access rates, smaller storage size and lower access latency than lower levels. The memory hierarchy comprises typically different levels of cache memories, where the highest level of cache memory provides the highest data access rate, the smallest storage size and the lowest access latency and is typically called the level one cache. The next lower level of cache memory is called the level two cache, followed by the level three cache on the next lower hierarchy level.

According to a further embodiment, the memory device is operable to redirect further cache injection data to a slower memory device if the cache counter limit of the cache counter is reached.

By redirecting further cache injection data to a slower memory device, data in the particular cache line is preserved to ensure data availability, thus providing high processor performance.

According to a further embodiment, a system is provided comprising a processing unit, an Input-Output (IO)-device, a main memory and at least one memory device according to the above presented embodiments of the invention. The processing unit, the IO-device, the main memory and the at least one memory device are preferably coupled by a local bus or local bus system respectively.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE DRAWINGS

Figure 1:
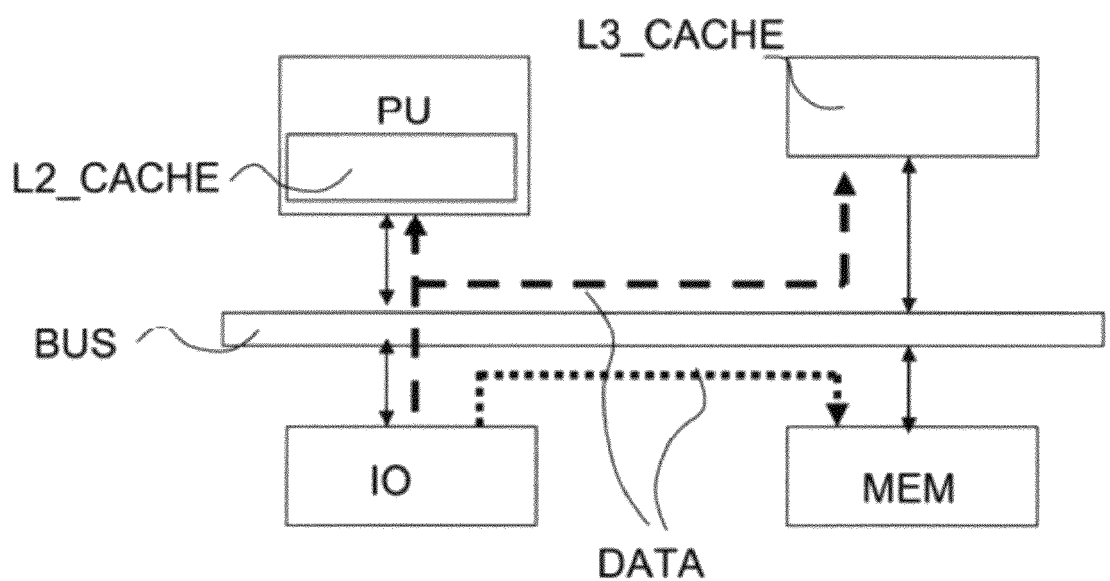
FIG. 1, a configuration of a processor system.

FIG. 1 shows a processor system supporting data injection into cache memories. The processor system comprises a processing unit PU with an associated cache memory device L2_CACHE connected to a local bus BUS. In addition, an IO-device IO is depicted, connected to the local bus BUS. The IO-device IO can be implemented as network interface card, connected to a local area network and communicating with other processor systems. Furthermore, the local cache memory device L3_CACHE and a memory MEM are interconnected to the local bus BUS. The local cache memory device L3_CACHE may be implemented as level three cache memory device, typically ranked on a lower memory hierarchy level than the processing unit PU associated cache memory device L2_CACHE which is, for example, implemented as level two cache memory device. The level two cache memory device L2_CACHE is typically integrated into the processing unit PU to guarantee low data access latencies and high data access rates. The level three cache memory device L3_CACHE is typically not integrated in the processing unit PU. Cache memory devices not integrated in processing units PU are typically denoted as victim cache devices. The memory MEM may be implemented as main memory, typically ranked below the level three cache memory device L3_CACHE from data access rates and storage point of view.

With data injection, the IO-device IO is the data-source of cache injection data. It transfers available data directly to the level two cache memory device L2_CACHE of the processing unit PU and/or to the level three cache memory device L3_CACHE connected to the local bus, indicated by the dashed arrow lines. In the moment of injecting data into the caches, the IO-device IO can be denoted as bus-actor. Beside the IO-device IO, other bus-actors can also be able to push data into cache memories, for example, other processing units or data copy engines such as direct memory access controllers. If a mechanism is available in the cache memory device L2_CACHE and L3_CACHE, inhibiting further data injections, the data is transferred from the IO-device IO directly to the main memory MEM, indicated by the dotted arrow lines.

Cache data injection is advantageous regarding the amount of memory accesses needed compared to data transfers of direct memory accesses. While the direct memory access has to process a write access to the destination memory data for writing data and to process a read access on a source memory device for reading data, the cache injection only needs one write access to the corresponding cache memory device, guaranteeing reduced memory bandwidth requirements.

Figure 2:
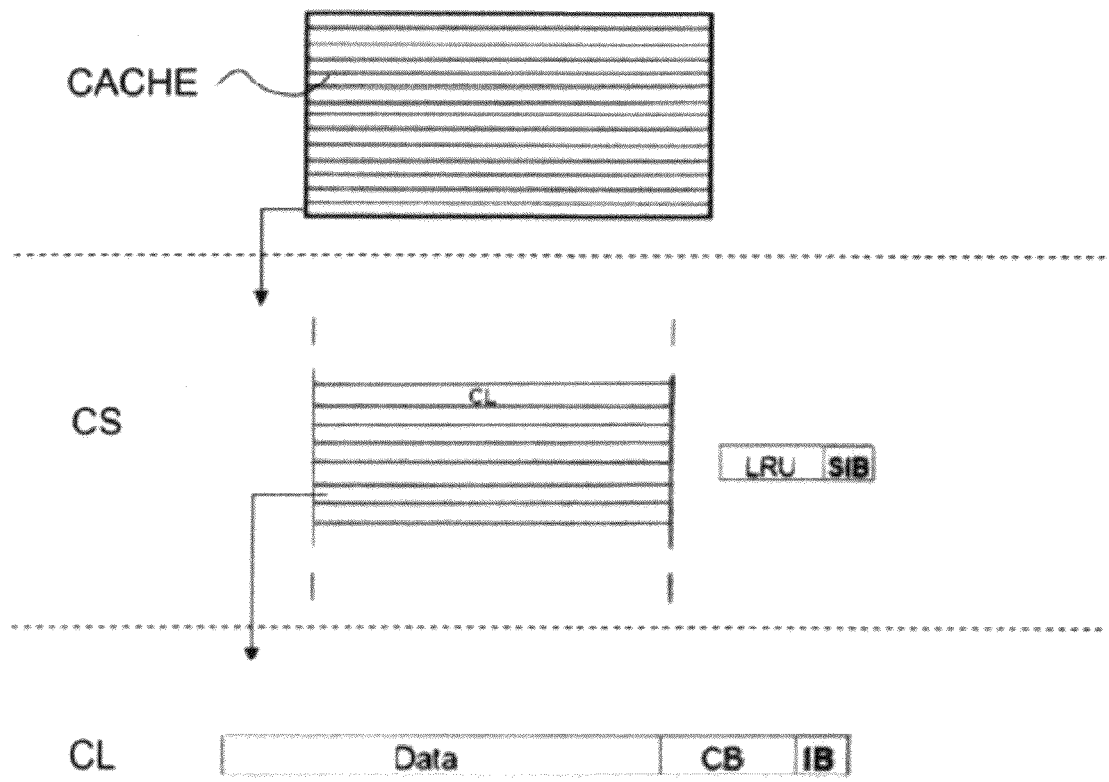
FIG. 2, a cache structure.

FIG. 2 shows a cache structure comprising a cache memory CACHE, implemented as set-associative cache memory. The set-associative cache structure is applicable for the level two cache memory device L2_CACHE and for the level three cache memory device L3_CACHE and in general applicable for all levels of cache memories. The cache memory CACHE is divided into multiple cache sets CS, each cache set CS comprising multiple cache lines CL; whereas each cache line CL representing a storage place for data DATA with predetermined storage size, for example 64 bytes. Each cache set CS comprises multiple status bits LRU for cast-out control. The predetermined amount of cache sets CS per cache memory CACHE and the predetermined amount of cache lines per cache set CS is typically fixed. Dependent on the cast-out policy predetermined for the particular cache memory device, the representation of the status bits is different. In FIG. 2 the status bits LRU represent a least recently used policy, casting out cache line data least recently accessed by the processing unit PU. In addition, each cache set CS comprises a set-injection-bit SIB. Beside the storage place for data entries, each cache line CL is associated to a set of control bits CB. The control bits CB are typically referenced as coherency bits indicating a specific data state, for example, the owner of data and/or a modification state of data, to determine operations on cast-outs of data such as write-back operations. In addition, an injection-bit IB is associated to the particular cache line CL, indicating storage of cache injection data triggered by bus-actors.

The cache set CS may be completely filled with cache injection data triggered by bus-actors, whereas all injection-bits IB within the cache set CS are set. The amount of cache injection data within one particular cache set can be predetermined to a lower amount than cache lines CL are available in the particular cache set CS. If the particular cache set CS is filled with the predetermined amount of the cache injection data and the corresponding injection-bit IB of the particular cache lines are set, the set-injection-bit SIB is set. If only one injection-bit IB of the predetermined amount of cache lines CL is unset, the set-injection-bit SIB is unset too, thus providing an efficient and fast lookup for free cache lines CL available for injecting further cache injection data.

Besides using separate injection-bits IB for indicating cache injection data, the control bits CB can be used to indicate cache injection too. Cache injection data is typically exclusively owned by the particular cache memory and is in a modified state, as long as no copy of cache injection data is written back elsewhere to the processor system. Consequently, one defined data state is associated with each injection data, which can be represented by a predetermined combination of control bits CB, currently not used to indicate a data state of non-injection data.

The set injection-bit IB and/or the associated cache line injection state is conserved as long as the predetermined cast-out policy replaces the cache injection data of the particular cache line CL by new data loaded after a cache miss. Replacing the cache injection data before processing it unsets the particular injection-bit IB or changes the control bits CB according to the currently stored data.

According to further embodiment, the injection-bits IB and/or the associated cache line injection state is conserved as long as the particular cache injection data is not accessed for processing. This reserves the particular cache line for cache injection data as long as cache injection data is stored within the particular cache line CL and is not accessed for processing by a processor. If the cache injection data is processed, the particular injection-bit IB is unset and/or the control bits CB are changed accordingly to indicate that cache injection data can be replaced by either new cache injection data or non-injection data. If the cache injection data of the particular cache line CL is not accessed for processing, the injection-bit IB and/or the cache line injection state will stay set and/or active, not allowing any data replacement. In this case, a mechanism can be introduced to clear all injection-bits IB and/or to deactivate the particular cache line injection state within the particular cache set or cache memory if required.

The injection-bit IB and the control bits CB can also be used in combination to store additional information for cache injection data entries. Using injection-bits IB to indicate cache injection data, the control bits CB can be used for additional information storage, for example, cache injection data priority entries. Especially to differentiate the originator of the pushed cache injection data, the control bits CB can be used to indicate if a cache injection data originates from an IO-device IO or another processing unit PU, for example, in a multi-processor system. Alternatively, a time stamp can be stored in the control bits CB used for determining a period of time the corresponding cache line is not accessed by the processor. Based on the determined period of time the cache injection data can be cast out in favor of non-injection data.

Figure 3:
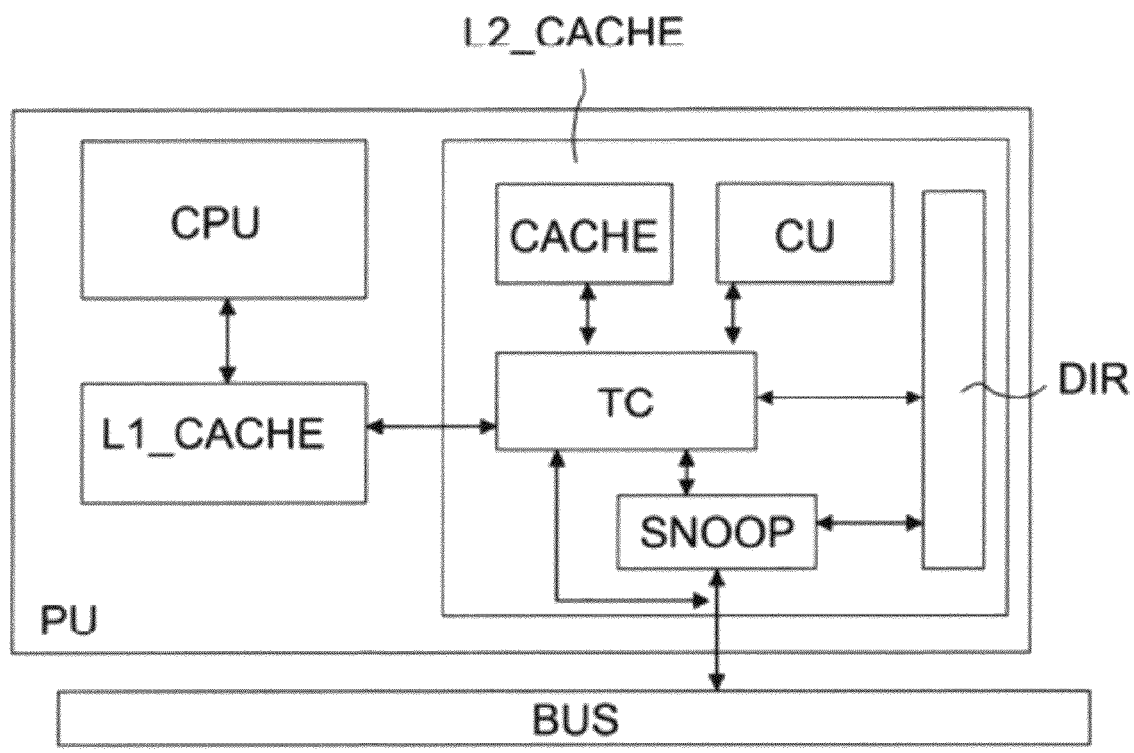
FIG. 3, a configuration of a processing unit.

FIG. 3 depicts a block diagram of the processing unit PU comprising a processor CPU, a level one cache memory device L1_CACHE and the level two cache memory device L2_CACHE. The processing unit PU is interconnected to the local bus BUS to interconnect, for example, with IO-devices IO or additional processing units PU, also interconnected to the local bus BUS. The level one cache memory device L1_CACHE is tightly coupled to the processor CPU to provide low data access latency and high data access rates to ensure high processing performance of the processor CPU. The level two cache memory device L2_CACHE is shown in detail including the cache memory CACHE storing data of cache lines CL. Furthermore, the level two cache memory device L2_CACHE comprises a cache directory DIR holding information of the cache sets CS and of the cache lines CL.

According to FIG. 2, the cache set CS information and the cache line CL information comprising status bits LRU, set-injection-bits SIB, control bits CB and injection-bits IB can be stored directly in the corresponding cache memory or according to FIG. 3 in a separate cache directory DIR module, which is associated to the cache memory CACHE. The cache directory DIR tracks the status of each cache line CL via the control bits CB and injection-bits IB and other information that, for example, indicate the corresponding addresses in main memory MEM with which each valid cache line CL is associated. In addition, the cache directory DIR comprises the status bits LRU of the particular cache set CS and its associated set-injection-bit SIB. The level two cache memory device L2_CACHE also comprises a bus snooper SNOOP that observes data transactions on the local bus BUS so that accesses to cache memory CACHE that affect cache memory locations can be noticed and cache directory DIR can be updated accordingly, for example, by invalidating corresponding cache lines CL. The level two cache memory device L2_CACHE further comprises a transfer circuit TC responsible for transferring data from the level one cache memory device L1_CACHE to the level two cache memory device L2_CACHE and leads further from the level two cache memory device L2_CACHE to the local bus BUS and vice versa. The transfer circuit TC is typically implemented using multiple independent transfer units in order to improve transfer performance of data, each responsible for a cache line CL operation. The level 2 cache memory device L2_CACHE also comprises the counter unit CU responsible for controlling data injection and for capturing cache injection data pushed into the cache memory CACHE. The counter unit CU is depicted as a separate module but can be integrated into the transfer circuit TC.

The processor CPU issues load and store instructions to the level one cache memory device L1_CACHE, which is operable as instruction data cache in a preferred embodiment. The level one cache memory device L1_CACHE is coupled to the level two cache memory device L2_CACHE and issues a data request on a level one cache miss to the level two cache memory device L2_CACHE. The level two cache memory device L2_CACHE either serves the data request from level one cache memory device L1_CACHE or issues on a level two cache miss a data request to another memory device interconnected to the local bus BUS, for example, the level 3 cache memory device L3_CACHE or the main memory MEM using a bus-transaction. If a new data entry is fetched into the determined cache line of the level two cache memory device L2_CACHE, the currently stored data is cast out and, for example, written back to the level three cache memory device L3_CACHE or the main memory MEM through the transfer circuit TC based on the cast-out policy, for example the least recently used policy. The bus snooper SNOOP analyses the data traffic on the local bus BUS and checks if operations on the local bus BUS affect cache lines CL stored in the cache memory CACHE using the cache directory DIR. If necessary, the bus snooper SNOOP updates cache directory DIR entries.

If cache injection data request is snooped on the local bus BUS the cache injection data accompanying the cache injection request are stored in the level two cache memory device L2_CACHE and the cache directory is updated by setting the corresponding injection-bit IB and/or by setting the cache line injection state via control bits CB of the corresponding cache line. The counter unit CU comprises cache counter unit CCU and/or at least one cache set counter unit SCU associated to each cache set CS available in the cache memory CACHE and is operable to capture cache injection data (not depicted in FIG. 3). The cache counter unit CCU comprises one cache counter CCNT (not depicted in FIG. 3) and the cache set counter unit SCU comprises at least one cache set counter SCNT (not depicted in FIG. 3). For capturing cache injection data, the counter unit CU is controlled by the transfer circuit TC in such a way that the cache counter CCNT and/or the cache set counter SCNT increments its counter reading if the injected data replaces non-injection data of the corresponding cache line CL or is pushed into free cache lines CL. Furthermore, the counter unit CU is controlled by the transfer circuit TC in such a way that the corresponding counter readings of the cache counter CCNT and/or the cache set counter SCNT are not altered if the cache injection data replaces another cache injection data entry in the corresponding cache line with set injection-bit IB. If the level one cache memory device L1_CACHE issues a read access to the transfer circuit TC of the level two cache memory device L2_CACHE, it will use a cache directory lookup to determine if the requested cache line CL is in cache memory CACHE. If the cache line CL is in cache memory CACHE and is marked with set injection-bit IB and/or with activated cache line injection state via control bits CB indicating cache injection data, the cache directory DIR is updated by unsetting the injection-bit IB and/or deactivating the cache line injection state and by setting the corresponding data state via control bits CB. Furthermore, the transfer circuit TC signals the counter unit CU to decrease the corresponding counter reading of the cache counter CCNT and/or the cache set counter SCNT. In case of casting out data marked as cache injection data before replacing the corresponding cache line CL with non-injection data, the counter unit CU is controlled in such a way that the counter reading of the cache counter CCNT and/or the counter reading of the cache set counter SCNT is decreased.

Figure 4:
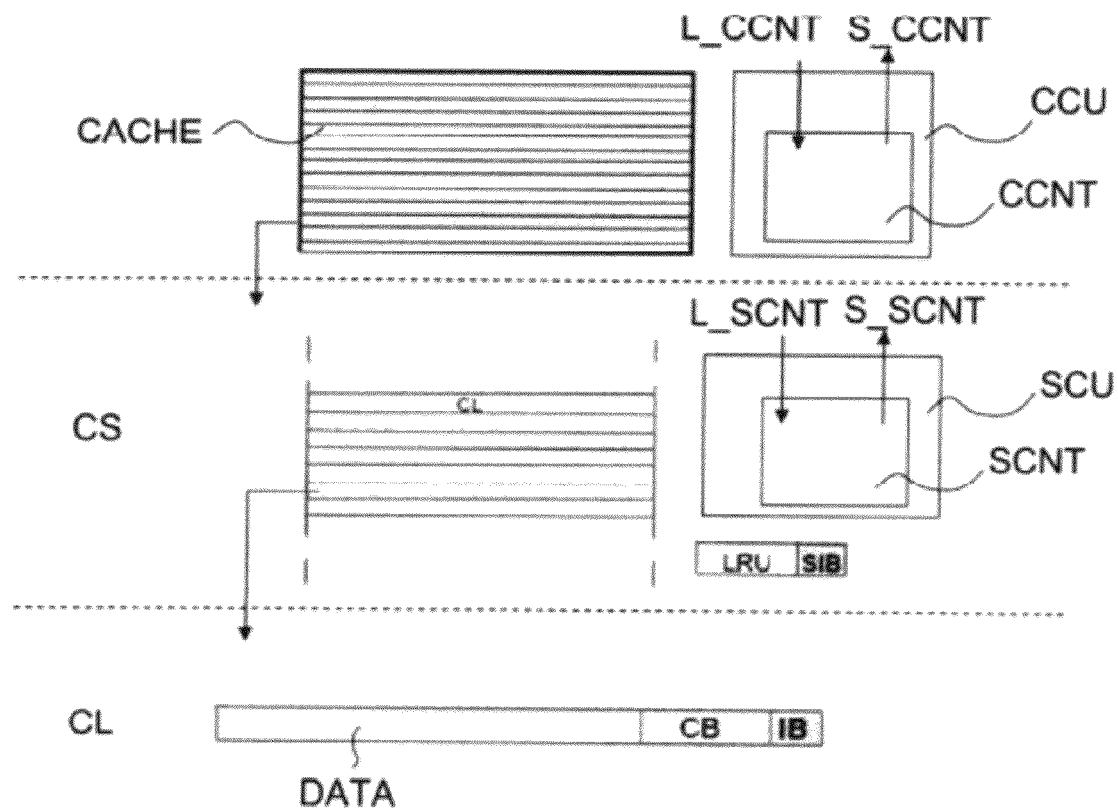
FIG. 4, a cache structure with a counter unit.

FIG. 4 depicts the association of the cache counter unit CCU and the cache set counter unit SCU of the counter unit CU to the particular cache set CS in the particular cache memory CACHE, whereas the cache counter unit CCU comprises the cache counter CCNT and the cache set counter unit SCU comprises the cache set counter SCNT. The cache counter CCNT is operable to increment and decrement its counter reading dependent on transfer circuit TC control. The cache set counter SCNT is operable to increment and decrement its counter reading dependent on transfer circuit TC control. A predetermined counter limit is associated to each counter, that is a cache counter limit L_CCNT for the cache counter CCNT and a cache set counter limit L_SCNT for the cache set counter SCNT. The counters are operable to increment their counter readings according to the description in FIG. 3. In addition, the cache counter unit CCU and the cache set counter unit CCU are operable to compare the counter reading of the cache counter CCNT and the cache set counter SCNT against a predetermined limit. The counters are furthermore operable to give a signal to the transfer circuit TC if the corresponding counter limit is reached or surpassed. The cache counter unit CCU generates a cache counter limit signal S_CCNT when its cache counter CCNT reaches or surpasses its associated cache counter limit L_CCNT and/or the cache counter unit CCU generates a cache set counter limit signal S_SCNT when its cache set counter SCNT reaches or surpasses its associated cache set counter limit L_SCNT.

A counter unit CU comprising both the cache counter unit CCU and at least one cache set counter CSU provides an advantageous handling of the cache injection data by varying the corresponding limits. If the cache counter limit L_CCNT is equal to or bigger than the product of the cache set counter limit L_SCNT and the amount of cache sets CS associated to the cache memory, then typically the cache set counter limit L_SCNT is more relevant than the cache counter limit L_CCNT, because the cache set counter limit L_SCNT is limiting the particular amount of cache injection data within the corresponding cache set CS. If the cache counter limit L_CCNT is smaller than the product of the cache set counter limit L_SCNT and the amount of cache sets CS associated to the cache memory, then typically the cache counter limits L_CCNT and the cache set counter limit L_SCNT are relevant, limiting the amount of cache injection data entries. The corresponding cache set counter limit L_SCNT limits the amount of cache injection data in one particular cache set CS, while a further pushing of cache injection data into another cache set CS is limited due to the fact that the cache counter limit L_CCNT is already reached.

In a preferred embodiment, the cache counter limit L_CCNT and the cache set counter limit L_SCNT are predetermined dynamically dependent on the current data processing and/or the workload conditions of the processor CPU. In cases where the data processing via processor CPU profits from cache injection data, for example on TCP processing, the limits can be predetermined to allow more cache injection data. In cases where the processing does not profit from cache injection data, for example, on high performance computing, the limits can be predetermined to allow less cache injection data. In addition, the level three cache memory device L3_CACHE or victim cache devices can be configured to take more cache injection data than higher level cache memory devices like level two or level one cache memory devices L2_CACHE or L1_CACHE.

According to a further embodiment, the counter unit can comprise only the cache counter unit CCU with its cache counter CCNT capturing all cache injection data pushed into the cache memory CACHE or cast out dependent on the cast-out policy. In this embodiment, only the associated cache counter limit L_CCNT is relevant for inhibiting further cache injection data if the cache counter CCNT reached its cache counter limit L_CCNT. If the cache counter limit L_CCNT is predetermined accordingly, a maximum amount of cache injection data can be pushed into the cache memory CACHE, ensuring high processor performance when data processing profits from cache injection data, for example, TCP processing.

Figure 5:
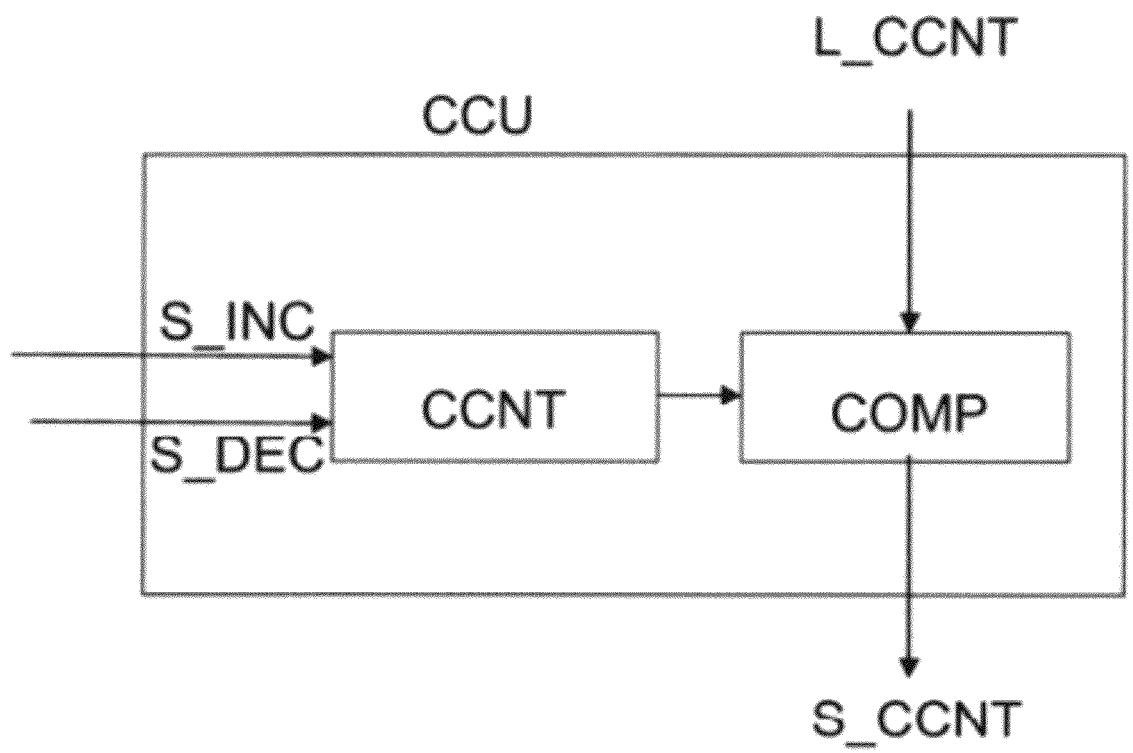
FIG. 5, a configuration of cache counter unit.

FIG. 5 depicts a block diagram of an exemplary cache counter unit CCU implementation, comprising the cache counter CCNT and cache counter compare unit COMP. This cache counter unit CCU implementation can be part of the counter unit CU shown in FIG. 4. The input of the cache counter CCNT is associated with an increment signal S_INC and a decrement signal S_DEC. The cache counter CCNT is typically implemented as increment and decrement counter. A predetermined signal pulse on the increment signal S_INC increments the current counter reading of the cache counter CCNT by a predetermined value, for example, by 1. A predetermined signal pulse on the decrement signal S_DEC decrements the current counter reading of the cache counter CCNT by a predetermined value, for example, by 1. The increment signal S_INC and the decrement signal S_DEC are derived from the transfer circuit TC of the corresponding cache memory device. The compare COMP is coupled to the output of the cache counter CCNT to observe counter readings. The corresponding cache counter limit L_CCNT is applied to the compare unit COMP to be compared against the counter reading of the cache counter CCNT. In case of a match between counter reading of the cache counter CCNT and cache counter limit L_CCNT or if the cache counter CCNT is bigger than the cache counter limit L_CCNT, the cache counter limit signal S_CCNT is generated and signalled to the transfer circuit TC of the corresponding cache memory device.

The cache set counter unit SCU is implemented analogous to the cache counter unit CCU shown in FIG. 5, comprising the cache set counter SCNT and a cache set compare unit applied with the cache counter limit L_SCNT, providing the cache set counter limit signal S_SCNT. The set-injection-bit SIB for the respective cache set CS can, for example, be set or unset dependent on the cache set counter limit signal S_CNT.

Figure 6:
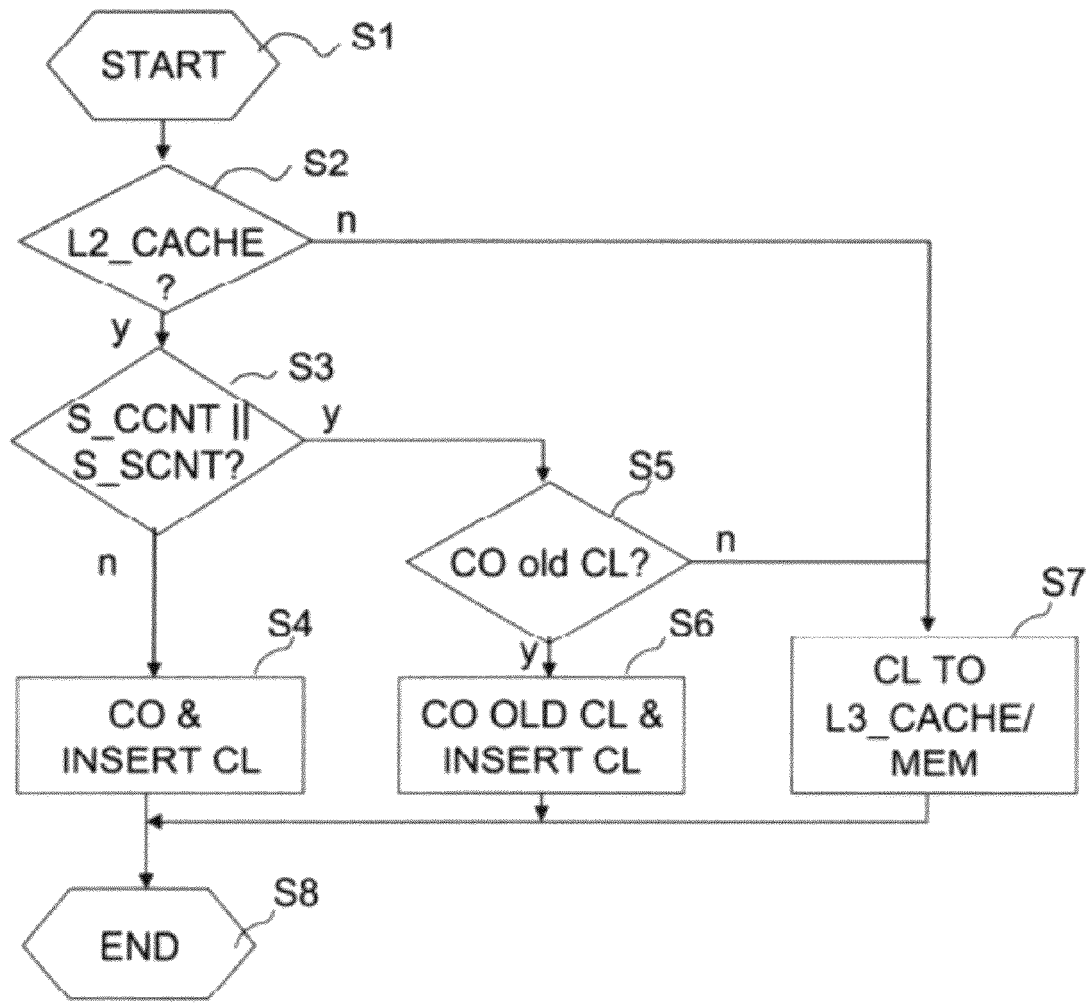
FIG. 6, a flowchart.

FIG. 6 shows a flowchart representing a decision path for cache injection data pushed into the corresponding cache memory device. The following description is based on a data injection into the level two cache memory device L2_CACHE, without limiting the description only to this cache memory device. In fact the following description of the decision path is applicable for all cache memory devices comprising the counter unit CU for controlling cache injection data. According to FIG. 6, the decision path starts in step S1, providing cache injection data referred to as new cache injection data in the following description, snooped by the bus snooper SNOOP. In step S2, a first check is processed to determine if the level cache memory device L_CACHE is the destination memory for cache injection data. If the level two cache memory device L2_CACHE is not the destination, the cache injection data is pushed into another memory device, for example, the next lower leveled cache memory device or into main memory MEM in step S7. Otherwise the corresponding cache set CS within cache memory CACHE is determined, where to store cache injection data. In step S3 the cache counter limit signal S_CCNT and the cache set counter limit signal S_SCNT are checked whether one of the signals indicate a match between the cache injection data limit L_CCNT and L_SCNT with cache counter CCNT or the particular cache set counter SCNT. If the cache counter L_CCNT or the cache set counter limit L_SCNT is reached, the cast-out policy check is processed in step S5 by checking if old cache injection data should be cast out for new cache injection data. If so, the old cache injection data in the particular cache line CL is cast out and is written into the main memory MEM or the next lower leveled memory device L3_CACHE in step S6, before new cache injection data is stored into the particular cache line CL. The counter reading of the corresponding cache counter CCNT and/or the corresponding cache set counter SCNT is not altered in this cast-out policy, due to the replacement of cache injection data without unsetting the injection-bit IB and/or deactivating the cache line injection state via control bits CB of the particular cache line CL. If the cast out policy predetermines no cast out of cache injection data in step S5, the new cache injection data is written into the next lower leveled cache memory device L3_CACHE or main memory MEM in step S7. The additional cast-out policy step in step S7 can be predetermined dynamically by the processor CPU dependent on its current data processing or its current workload condition.

If both counter limits L_CCNT and L_SCNT are not reached, data can be injected into free cache lines CL of the determined cache set SC, if available or the data can be injected after the current data of the corresponding cache line CL is cast out based on the least recently used cast-out policy in step S4. The new cache injection data entry is indicated by setting the corresponding injection-bit IB and/or activating the cache line injection state via control bits CB. Furthermore, the cache counter CCNT and/or the cache set counter SCNT is incremented. The decision path ends in step S8.

Besides using the counter unit CU in set-associative cache memory devices as described in FIG. 1 to FIG. 6, it can also be used with full-associative cache memory devices. Full-associative memory devices are characterized by a single cache set CS comprising all available cache lines CL in the cache memory CACHE. Data to be stored within the cache memory CACHE can be stored in any of the available cache lines CL. With full-associative cache memory devices, the cache counter unit CCU is typically implemented to capture cache injection data pushed into the cache memory and to inhibit further data injection if the corresponding cache counter limit L_CCNT is reached.

Obviously, many modifications and variations of the cache injection data indication and the implementation of the counter units are possible and will be apparent to a person skilled in the art of cache memory devices and of cast-out and cast-in policies without departing from the gist of the invention as described herein.

Figure 7:
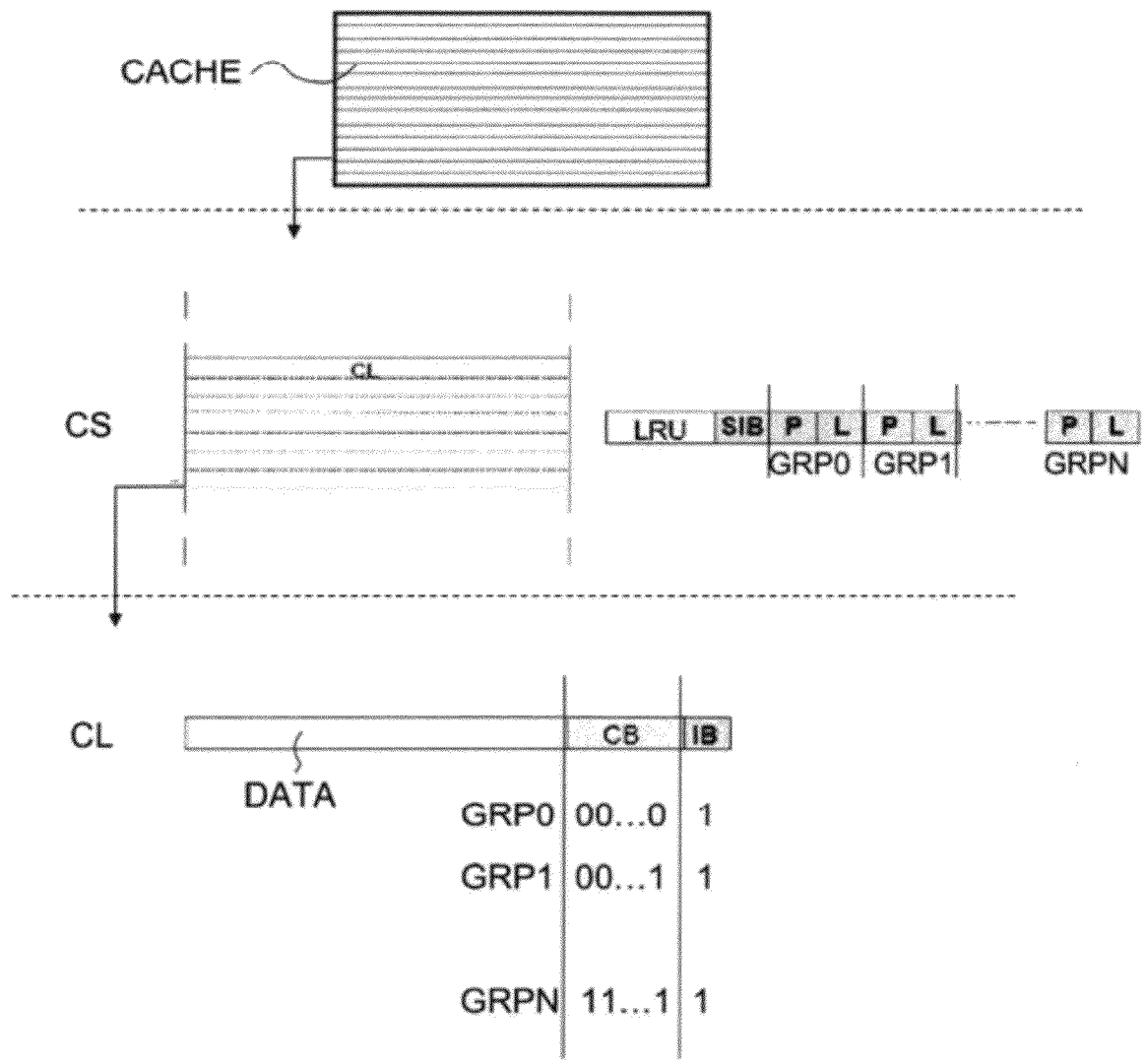
FIG. 7, an additional cache structure.

FIG. 7 depicts a cache memory CACHE comprising multiple cache sets CS, whereas each cache set CS comprises multiple cache lines CL. Each cache line CL comprises a data entry DATA, multiple control bits CB and at least one injection-bit IB. In cases where the particular cache line CL comprises cache injection data, the injection-bit IB is typically set. If the particular injection-bit IB is set, the control bits CB can be used for supplemental information storage, for example, for origin or data priority information storage. The supplemental information is typically different to the information stored in the control bits CB, if the particular injection-bit IB is not set. Each cache injection data entry in the cache memory CACHE can be associated to a predetermined group, whereas each group is associated with common cache injection data properties, as for example, identical origins or identical data priorities. As shown in FIG. 7, the first group GRP0 corresponds to a zero entry in the control bits CB. The second group GRP1 corresponds to a one entry in the control bits CB. Each subsequent group corresponds to an entry incremented by one compared to the preceding group. The maximum amount of groups is typically dependent on the available number of control bits CB, for example with eight control bits CB 256 different groups can be associated. Groups can, for example, help differentiate cache injection data according to their origin or can help distinguish different levels of data priority.

In addition, each cache set CS comprises a group-present-bit P and a group-limit-bit L for each group. The particular group-present-bit P is typically set if at least one cache line CL in the particular cache set CS comprises cache injection data associated to the particular group. If the cache set CS comprises no cache line CL with cache injection data associated to the particular group, the particular group-present-bit P is unset. The particular group-limit-bit L of the particular group is set if a predetermined limit of entries associated to the group is reached. The group-limit-bit L is unset if the amount of entries associated to the group is below the particular limit. The particular group limit can be predetermined and associated to each group, limiting the amount of cache injection data associated to the particular group within each cache set CS. In addition, it is possible to associate a group limit to each group limiting the amount of cache injection data entries associated to the particular group within the cache memory CACHE. The group mechanism and the associated group limit make it possible to use data injection in a fine-grained manner.

The invention claimed is:

1. Memory device comprising:
  a cache memory (CACHE) with a predetermined amount of cache sets (CS), each cache set comprising a predetermined amount of cache lines (CL), each cache line (CL) configured to indicate a cache data injection into the particular cache line triggered by a bus-actor (IO, PU);
  more than one control bits (CB) associated with a particular cache line; and
  at least one injection-bit (IB) associated with a particular cache line,
  wherein the memory device is operable to store supplemental information different from the current state of the data of the particular cache line (CL) in the more than one control bit (CB) while the at least one injection-bit (IB) is set, and otherwise to store the current state of the cache line data in the more than one control bit (CB); and the memory device is configured to set the at least one injection-bit (IB) if data is pushed from a bus-actor into the particular cache line.

2. Memory device according to claim 1, wherein the at least one injection bit (IB) is operable to indicate cache data injection, the memory device being operable to set the at least one injection-bit (IB) if cache injection data is pushed from a bus-actor (IO, PU) into the particular cache line (CL).

3. Memory device according to claim 2, being operable to unset the at least one injection-bit (IB) if the particular pushed cache injection data entry is accessed by a component to process the cache injection data.

4. Memory device according to claim 1, wherein the more than one control bits (CB) are operable to indicate a current state of its data, whereas a cache line injection state is associated to a predetermined combination of the control bits (CB) in such a way, that the predetermined combination of the control bits (CB) is different to the control bit (CB) combinations representing states of the data of the particular cache line.

5. Memory device according to claim 1, in which the more than one control bits (CB) represent group information, the memory device being operable to associate a particular group to each cache line (CL) comprising cache injection data and to associate cache lines (CL) comprising cache injection data entries with common predetermined properties to identical groups.

6. Memory device according to claim 5, in which multiple group-present-bits (P) are associated to the particular cache set (CS), whereas one group-present-bit (P) is associated to each group, the memory device being operable to set the particular group-present-bit (P) if at least one cache line (CL) in the particular cache set (CS) comprises cache injection data associated to the particular group.

7. Memory device according to claim 5, in which multiple group-limit-bits (L) are associated to the particular cache set (CS) and one group-limit-bit (L) is associated to each group, the memory device being operable to set the particular group-limit-bit (L) if a predetermined amount of cache lines (CL) comprising cache injection data associated to the particular group is reached.

8. Memory device according to claim 1, in which a particular cache set counter unit (SCU) with a cache set counter is associated to the particular cache set (CS), the memory device being operable to increment the cache set counter on each setting of one injection-bit (IB) of the particular cache set (CS) or to decrement the cache set counter on each resetting of one injection-bit (IB) of the particular cache set (CS).

9. Memory device according to claim 8, being operable to inhibit a further cache data injection into the particular cache set (CS) if a predetermined cache set counter limit (L_SCNT) is reached by the cache set counter.

10. Memory device according to claim 9, being operable to predetermine the cache set counter limit dependent on the data processing and/or workload conditions of a processing unit, which is associated to the cache memory.

11. Memory device according to claim 8, being operable to push cache injection data into cache lines with set injection-bit (IB) if a predetermined cache set counter limit (L_SCNT) is reached by the cache set counter.

12. Memory device according to claim 8, comprising at least one cache counter unit (CCU) with the cache counter (CCNT) and at least one cache set counter unit (SCU) with one cache set counter (SNCT), whereas a particular cache set (CS) is associated to at least one of the at least one cache set counter unit (SCU).

13. Memory device according to claim 12, in which the cache counter limit (L_CCNT) of the cache counter (CCNT) is equal or bigger than the product of the cache set counter limit (L_SCNT) of the particular cache set counter and the amount of cache sets (CS) associated to the cache memory.

14. Memory device according to claim 12, in which the cache counter limit (L_CCNT) of the cache counter (CCNT) is smaller than the product of the cache set counter limit (L_SCNT) of the particular cache set counter and the amount of cache sets (CS) associated to the cache memory.

15. Memory device according to claim 1, comprising a cache counter unit (CCU) with a cache counter (CCNT), the memory device being operable to increment the cache counter (CCNT) on each setting of one injection-bit (IB) in the cache memory or to decrement the cache counter (CCNT) on each resetting of one injection-bit (IB) in the cache memory.

16. Memory device according to claim 15, being operable to inhibit a further push of cache injection data into the cache memory if a predetermined cache counter limit (L_CCNT) is reached by the cache counter (CCNT).

17. Memory device according to claim 16, being operable to predetermine the cache counter limit (L_CCNT) dependent on the data processing and/or workload conditions of the processing unit, which is associated to the cache memory.

18. Memory device according to claim 15, being operable to push cache injection data into cache lines with set injection-bit (IB) if a predetermined cache counter limit (L_CCNT) is reached by the cache counter (CCNT).

19. Memory device according to claim 1, being operable to cast-out cache data of cache lines (CL) of the particular cache set (CS) dependent on a predetermined cast-out policy of cache data and to push cache injection data into the particular cache line (CL) and to set an injection-bit (IB) of the particular cache line if a cache set counter limit is not reached by the cache set counter.

20. Memory device according to claim 19, being operable to cast-out cache lines (CL) of the particular cache set (CS) comprising cache injection data dependent on the predetermined cast-out policy.

21. Memory device according to claim 19, being operable to cast-out only cache lines (CL) of the particular cache set (CS) with unset injection-bit (IB) dependent on the predetermined cast-out policy.

22. Memory device according to claim 1, being operable to redirect further cache injection data into a slower memory device if a cache set counter limit of a cache set counter is reached.

23. Memory device according to claim 1, being operable to redirect further cache injection data into a slower memory device if a cache counter limit (L) of a cache counter (CCNT) is reached.

24. A system comprising a processing unit (PU), an Input-Output (IO)-device, a main memory (MEM) and at least one memory device according to the preceding claim 1.

* * * * *